US012695295B2

(12) United States Patent
Yamada et al.

(10) Patent No.:  US 12,695,295 B2
(45) Date of Patent:  Jul. 28, 2026

(54) OVERCURRENT PROTECTION CIRCUIT, SEMICONDUCTOR DEVICE, ELECTRONIC APPARATUS, AND VEHICLE

(71) Applicant: ROHM CO., LTD., Kyoto (JP)

(72) Inventors: Katsuaki Yamada, Kyoto (JP); Toru Takuma, Kyoto (JP); Shuntaro Takahashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 187 days.

(21) Appl. No.: 18/792,110

(22) Filed: Aug. 1, 2024

(65) Prior Publication Data

US 2025/0055275 A1     Feb. 13, 2025

(30) Foreign Application Priority Data

Aug. 9, 2023     (JP) ................................. 2023-130047

(51) Int. Cl.
H02H 9/02          (2006.01)

(52) U.S. Cl.
CPC ................................... H02H 9/025 (2013.01)

(58) Field of Classification Search
CPC ...... H02H 9/025; H02H 1/0007; H02H 9/001; H03K 17/0822
USPC ......................................................... 361/87
See application file for complete search history.

(56) References Cited

U.S. PATENT DOCUMENTS

| 2013/0127533 A1* | 5/2013 | Liu ..................... H03F 3/45076 |
| | | 330/254 |
| 2013/0278236 A1* | 10/2013 | Nakahara .................. G05F 1/10 |
| | | 323/282 |
| 2019/0123541 A1* | 4/2019 | Takuma .................. B60R 16/03 |
| 2023/0155559 A1* | 5/2023 | Takano ..................... H03F 3/72 |
| | | 330/253 |
| 2023/0208360 A1* | 6/2023 | Nomura .................. H03F 3/303 |
| | | 330/261 |

FOREIGN PATENT DOCUMENTS

| CN | 115051579 A | * | 9/2022 | ............ H10W 90/00 |
| JP | 2023-050714 | | 4/2023 | |
| WO | WO 2017/187785 | | 11/2017 | |

* cited by examiner

*Primary Examiner* — Sreeya Sreevatsa
(74) *Attorney, Agent, or Firm* — Fish & Richardson P.C.

(57)     ABSTRACT

An overcurrent protection circuit that limits a current to be monitored based on a current limit signal includes: a first transistor and a second transistor configured to form an amplifier input stage that receives input of a detection signal according to the current to be monitored; a third transistor configured to generate a current output signal according to a difference between the detection signal and a reference signal, and configured to form an amplifier output stage that inputs the current output signal as a negative feedback to the amplifier input stage; and a current mirror circuit configured to generate the current limit signal by replicating a signal based on the current output signal.

15 Claims, 12 Drawing Sheets

OVERCURRENT PROTECTION CIRCUIT, SEMICONDUCTOR DEVICE, ELECTRONIC APPARATUS, AND VEHICLE

CROSS-REFERENCE TO RELATED APPLICATION

This application is based upon and claims the benefit of priority from Japanese Patent Application No. 2023-130047, filed on Aug. 9, 2023, the entire contents of which are incorporated herein by reference.

TECHNICAL FIELD

The present disclosure relates to an overcurrent protection circuit, a semiconductor device, an electronic apparatus, and a vehicle.

BACKGROUND

The applicant of the present application has proposed many new techniques regarding semiconductor devices such as in-vehicle IPDs (Intelligent Power Devices).

In addition, as a related technique for an overcurrent protection circuit incorporated in a semiconductor device, an overcurrent protection circuit that can detect an overcurrent with high accuracy has been proposed.

BRIEF DESCRIPTION OF DRAWINGS

The accompanying drawings, which are incorporated in and constitute a part of the specification, illustrate embodiments of the present disclosure.

FIG. 8 is a diagram showing a first configuration example of a control circuit.

FIG. 9 is a diagram for explaining an operation of the control circuit shown in FIG. 8.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In the present disclosure, a MOS (Metal Oxide Semiconductor) field effect transistor refers to a transistor having a gate structure including at least three layers of a "layer made of a conductor or a semiconductor such as polysilicon with a low resistance value," an "insulating layer," and a "P-type, N-type, or intrinsic semiconductor layer." That is, the gate structure of the MOS field effect transistor is not limited to a three-layer structure of metal, oxide, and semiconductor.

First Embodiment

Figure 1:
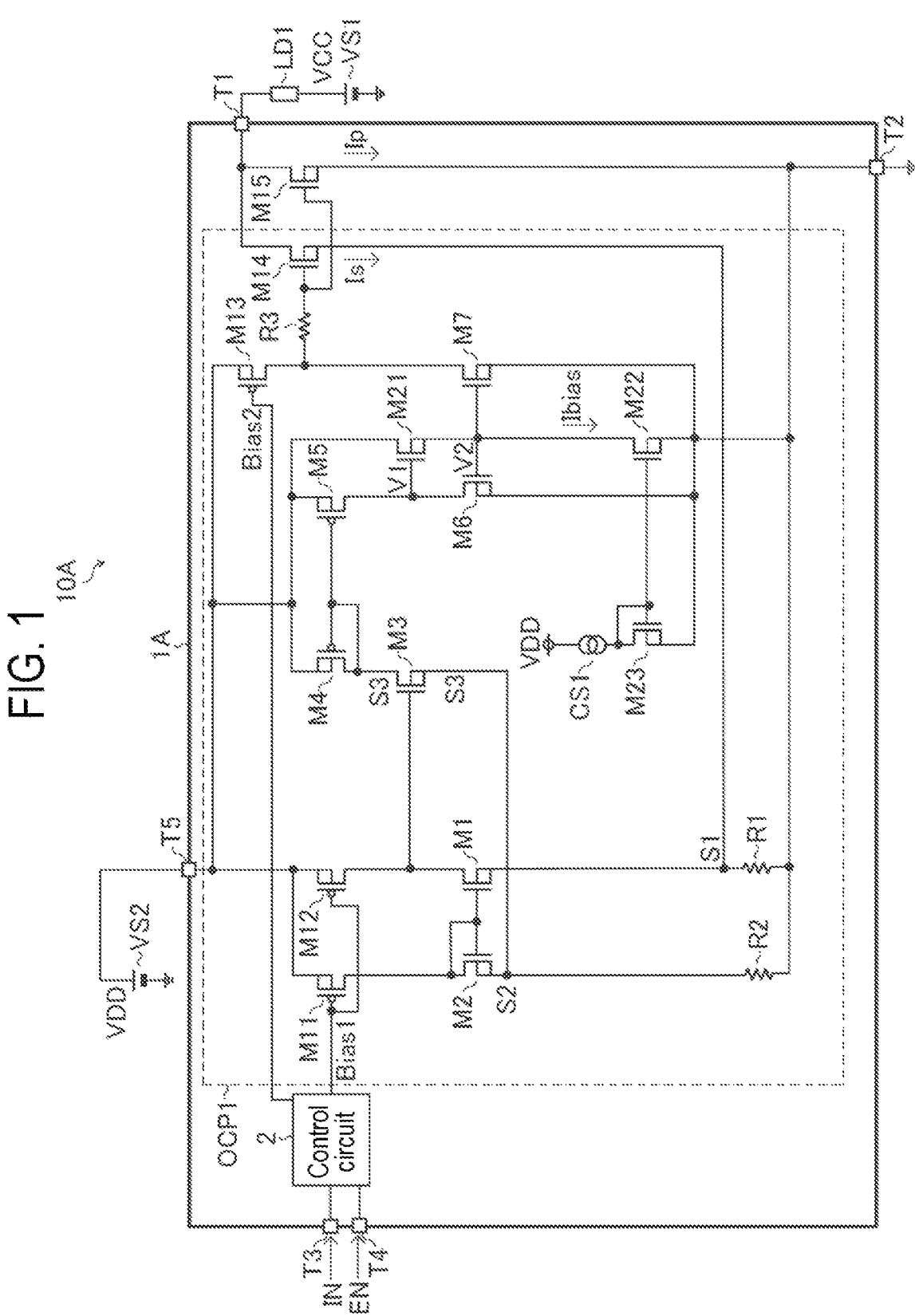
FIG. 1 is a diagram showing a configuration of an electronic apparatus according to a first embodiment.

FIG. 1 is a diagram showing a configuration of an electronic apparatus according to a first embodiment. An electronic apparatus 10A shown in FIG. 1 includes a semiconductor device 1A, a load LD1, and DC (Direct Current) power supplies VS1 and VS2.

The semiconductor device 1A is a low-side switch IC (a type of IPD) that connects and disconnects between the load LD1 and a ground potential.

The semiconductor device 1A includes terminals T1 to T5 as means for establishing electrical connection with the outside of the device.

The terminal T1 is connected to a first end of the load LD1. A second end of the load LD1 is connected to a positive electrode of the DC power supply VS1. The terminal T2 is connected to the ground potential. The terminal T3 receives an input signal IN.

The terminal T4 receives an enable signal EN. When the enable signal EN is at a HIGH level, a control circuit 2, which will be described later, is in an on state (operating state). When the enable signal EN is at a LOW level, the control circuit 2, which will be described later, is in an off state (non-operating state). When the enable signal EN switches from the LOW level to the HIGH level, the control circuit 2, which will be described later, enters an initial state and starts operating.

The terminal T5 is connected to a positive electrode of the DC power supply VS2. A negative electrode of each of the DC power supplies VS1 and VS2 is connected to the ground potential. The DC power supply VS1 outputs a voltage VCC. The DC power supply VS2 outputs a voltage VDD. The voltage VCC and the voltage VDD may have the same value or may have different values.

The semiconductor device 1A includes an overcurrent protection circuit OCP1, the control circuit 2, and a MOS field effect transistor M15 which is an output transistor.

The control circuit 2 is connected to the terminals T3 and T4. The control circuit 2 turns the MOS field effect transistor M15 off when the input signal IN is at a LOW level, and turns the MOS field effect transistor M15 on when the input signal IN is at a HIGH level.

The control circuit 2 has an overheat protection function and turns the MOS field effect transistor M15 off when a temperature near the MOS field effect transistor M15 exceeds a predetermined value, regardless of a level of the input signal IN.

The MOS field effect transistor M15 is an N-channel MOS field effect transistor. A drain of the MOS field effect transistor M15 is connected to the terminal T1. A source and a back gate of the MOS field effect transistor M15 are connected to the terminal T2. The MOS field effect transistor M15 is connected in series to the load LD1 via the terminal T1.

The overcurrent protection circuit OCP1 monitors an output current Ip (a source current of the MOS field effect transistor M15) and protects the MOS field effect transistor M15.

The overcurrent protection circuit OCP1 includes MOS field effect transistors M1 to M7, M11 to M14, and M21 to M23, and resistors R1 and R2.

The MOS field effect transistors M11 and M12 are P-channel MOS field effect transistors. A source and a back gate of each of the MOS field effect transistors M11 and M12 are connected to the terminal T5.

The control circuit 2 supplies a bias voltage Bias1 to a gate of each of the MOS field effect transistors M11 and M12. The control circuit 2 sets the bias voltage Bias1 to a LOW level when the input signal IN is at the HIGH level and overheat protection is not performed. At this time, each of the MOS field effect transistors M11 and M12 operates as a current source that outputs a reference current.

On the other hand, the control circuit 2 sets the bias voltage Bias1 to a HIGH level when at least one of a first condition that the input signal IN is at the LOW level or a second condition that the overheat protection is performed is satisfied. At this time, a drain current of each of the MOS field effect transistors M11 and M12 becomes zero.

The MOS field effect transistors M1 to M3 are N-channel MOS field effect transistors.

A drain of the MOS field effect transistor M11 is connected to a drain and a gate of the MOS field effect transistor M2 and a gate of the MOS field effect transistor M1.

A drain of the MOS field effect transistor M12 is connected to the drain of the MOS field effect transistor M1 and a gate of the MOS field effect transistor M3.

A source and a back gate of the MOS field effect transistor M1 are connected to a first end of the resistor R1 and a source and a back gate of the MOS field effect transistor M14 which is an N-channel MOS field effect transistor. A second end of the resistor R1 is connected to the ground potential via the terminal T2.

A source and a back gate of the MOS field effect transistor M2 are connected to a first end of the resistor R2 and a source and a back gate of the MOS field effect transistor M3. A second end of the resistor R2 is connected to the ground potential via the terminal T2.

A drain current of the MOS field effect transistor M3 is replicated by a first current mirror circuit constituted by the MOS field effect transistors M4 and M5, which are P-channel MOS field effect transistors, and a second current mirror circuit constituted by the MOS field effect transistors M6, M7, and M21 to M23, which are N-channel MOS field effect transistors, and a current source CS1. Therefore, a drain current of the MOS field effect transistor M13, which is a P-channel MOS field effect transistor, is a current that is a replication of the drain current of the MOS field effect transistor M3. The drain current of the MOS field effect transistor M13 becomes a current limit signal for limiting the output current Ip.

A source and a back gate of each of the MOS field effect transistors M4, M5, M13, and M21 are connected to the terminal T5. A drain and a gate of the MOS field effect transistor M4 and a gate of the MOS field effect transistor M5 are connected to a drain of the MOS field effect transistor M3.

A drain of the MOS field effect transistor M5 is connected to a gate of the MOS field effect transistor M21 and a drain of the MOS field effect transistor M6. A source and a back gate of the MOS field effect transistor M21 are connected to a gate of each of the MOS field effect transistors M6 and M7 and a drain of the MOS field effect transistor M22. The voltage VDD is applied to a first end of the current source CS1. A second end of the current source CS1 is connected to a gate of the MOS field effect transistor M22 and a gate and a drain of the MOS field effect transistor M23. A source and a back gate of each of the MOS field effect transistors M6, M7, M22, and M23 are connected to the ground potential via the terminal T2.

A drain of the MOS field effect transistor M7 is connected to a drain of the MOS field effect transistor M13 and a first end of a resistor R3.

The control circuit 2 supplies a bias voltage Bias2 to a gate of the MOS field effect transistor M13. The control circuit 2 sets the bias voltage Bias2 to a LOW level when the input signal IN is at a HIGH level and overheat protection is not performed. At this time, the MOS field effect transistor M13 operates as a current source.

On the other hand, the control circuit 2 sets the bias voltage Bias2 to a HIGH level when at least one of the first condition that the input signal IN is at the LOW level or the second condition that the overheat protection is performed is satisfied. At this time, the drain current of the MOS field effect transistor M13 becomes zero.

A second end of the resistor R3 is connected to a gate of each of the MOS field effect transistors M14 and M15.

The MOS field effect transistor M14 outputs a sense current Is according to the output current Ip. The resistor R1 converts the sense current Is into a detection signal (detection voltage) S1 according to the output current Ip.

The MOS field effect transistors M1 and M2 form an amplifier input stage that receives an input of the detection signal (detection voltage) S1 according to the output current Ip. The MOS field effect transistor M1 receives the input of the detection signal (detection voltage) S1 according to the output current Ip. The MOS field effect transistor M2 receives an input of a reference signal (reference voltage) S2.

The MOS field effect transistor M3 forms an amplifier output stage, which generates a current output signal (a source current and the drain current of the MOS field effect transistor M3) S3 according to a difference between the detection signal (detection voltage) S1 and the reference signal (reference voltage) S2 and inputs the current output signal (the source current of the MOS field effect transistor M3) S3 as a negative feedback to the amplifier input stage. Thus, an output current can be limited with high accuracy.

<Details of Second Current Mirror Circuit>

In order to achieve high-speed response of an overcurrent protection circuit, it is necessary to shorten a startup time of a current mirror circuit having a high current gain, which is provided in the overcurrent protection circuit. Further, when reducing a gain in the current mirror circuit, it is necessary to increase a reference current. Thus, problems may occur in that current consumption of the overcurrent protection circuit increases and an operation range of an amplifier provided at a front stage of the current mirror circuit becomes narrow.

Therefore, the overcurrent protection circuit OCP1 achieves high-speed response by setting a total gain of the first current mirror circuit and the second current mirror circuit to be a high current gain, setting a gain of the first current mirror circuit to be lower than that of the second current mirror circuit (for example, a current amplification factor of 1, that is, a mirror ratio of 1:1), and configuring the second current mirror circuit to be capable of making high-speed response.

The second current mirror circuit can supply a charging current to the gate of each of the MOS field effect transistors M6 and M7 by the MOS field effect transistor M21 which is a source follower circuit, so that the startup time can be shortened.

Since a value of a discharging current that discharges the gate of each of the MOS field effect transistors M6 and M7 is controlled by a current source, which is configured by the current source CS1 and the MOS field effect transistors M22 and M23, the second current mirror circuit can control a behavior (waveform) of the output current Ip when the output current Ip is limited, to a desired behavior (waveform).

Figure 2:
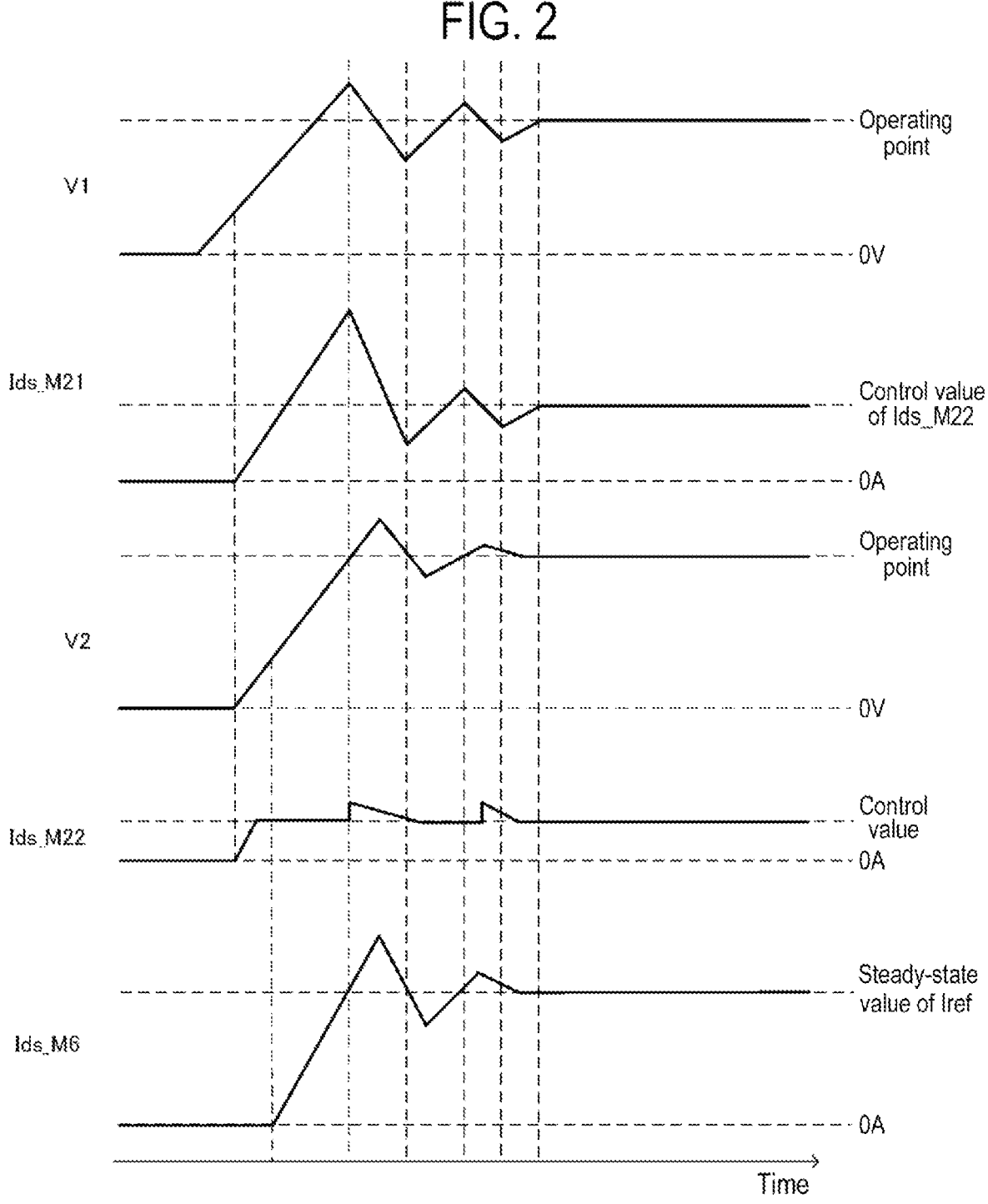
FIG. 2 is a waveform diagram for explaining an operation of a second current mirror circuit.

FIG. 2 is a waveform diagram for explaining an operation of the second current mirror circuit. From top to bottom, a waveform diagram of a gate voltage V1 of the MOS field effect transistor M21, a waveform diagram of a drain current Ids_M21 of the MOS field effect transistor M21, a waveform diagram of a gate voltage V2 of the MOS field effect transistors M6 and M7, a waveform diagram of a drain current Ids_M22 of the field effect transistor M22, and a waveform diagram of a drain current Ids_M6 of the MOS field effect transistor M6 are depicted in FIG. 2.

When a reference current (drain current of the MOS field effect transistor M5) Iref increases due to startup of the overcurrent protection circuit OCP1, the gate voltage V1 of the MOS field effect transistor M21 also increases.

Following the increase in the gate voltage V1 of the MOS field effect transistor M21, the drain current Ids_M21 of the MOS field effect transistor M21 begins to flow. As a result, charging of the gate of each of the MOS field effect transistors M6 and M7 is started by the MOS field effect transistor M21, and the gate voltage V2 of the MOS field effect transistors M6 and M7 increases.

When the gate voltage V2 of the MOS field effect transistors M6 and M7 increases and a gate-source voltage of the MOS field effect transistor M6 exceeds a threshold voltage, the drain current Ids_M6 of the MOS field effect transistor M6 begins to flow.

Thereafter, when the gate voltage V2 of the MOS field effect transistors M6 and M7 further increases and exceeds an operating point the MOS field effect transistor M6, the MOS field effect transistor M6 decreases the gate voltage V1 of the MOS field effect transistor M21 in order to maintain the drain current Ids_M6 of the MOS field effect transistor M6 at a steady-state value of the reference current Iref.

When the gate voltage V1 of the MOS field effect transistor M21 decreases, the charging current by the MOS field effect transistor M21 decreases, and a current Ibias (drain current Ids_M22 of the MOS field effect transistor M22) corresponding to the discharging current becomes dominant over the charging current. Therefore, the gate voltage V2 of the MOS field effect transistors M6 and M7 also decreases.

Thereafter, when the gate voltage V2 of the MOS field effect transistors M6 and M7 further decreases below the operating point, the MOS field effect transistor M6 increases the gate voltage V1 of the MOS field effect transistor M21 in order to maintain the drain current Ids_M6 of the MOS field effect transistor M6 at the steady-state value of the reference current Iref.

When the gate voltage V1 of the MOS field effect transistor M21 increases, the charging current by the MOS field effect transistor M21 increases, and the charging current becomes dominant over the current Ibias (the drain current Ids_M22 of the MOS field effect transistor M22)

corresponding to the discharging current. Therefore, the gate voltage V2 of the MOS field effect transistors M6 and M7 also increases.

Thereafter, the gate voltage V1 of the MOS field effect transistor M21 and the gate voltage V2 of the MOS field effect transistors M6 and M7 repeatedly increase and decrease, and converge to the operating point.

A rate of change when the gate voltage V2 of the MOS field effect transistors M6 and M7 decreases depends on a control value of the drain current Ids_M22 of the MOS field effect transistor M22. The control value of the drain current Ids_M22 of the MOS field effect transistor M22 is determined by a set value of an output current of the current source CS1.

When the control value of the drain current Ids_M22 of the MOS field effect transistor M22 is large, a transition time of the gate voltage V2 from increasing to decreasing becomes shorter and the rate of change when the gate voltage V2 decreases becomes larger. As a result, overshoot of the gate voltage V2 of the MOS field effect transistors M6 and M7 becomes smaller. On the other hand, when the control value of the drain current Ids_M22 of the MOS field effect transistor M22 is small, the transition time of the gate voltage V2 from increasing to decreasing becomes longer and the rate of change when the gate voltage V2 decreases becomes smaller. As a result, the overshoot of the gate voltage V2 of the MOS field effect transistors M6 and M7 becomes larger.

After the output current Ip reaches a start value, the overcurrent protection circuit OCP1 limits the output current Ip so that the output current Ip converges to a limit value smaller than the start value.

Figure 3:
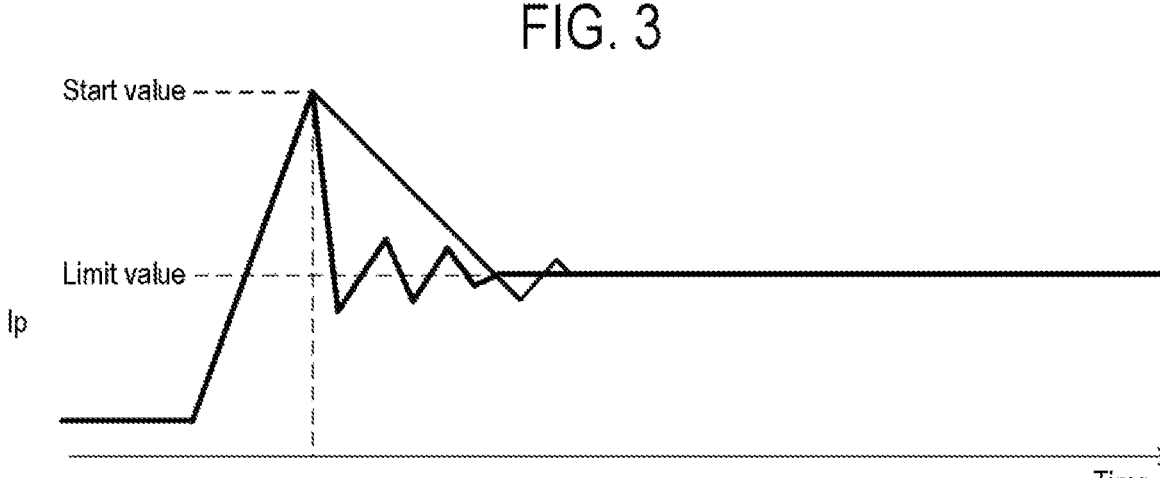
FIG. 3 is a waveform diagram of an output current of a semiconductor device according to the first embodiment.

Therefore, for example, when a difference between the start value and the limit value is large as shown in FIG. 3, in order to suppress heat generation in the MOS field effect transistor M15 which is an output transistor, the control value of the drain current Ids_M22 of the MOS field effect transistor M22 may be set to be small so that priority is given to reducing the output current Ip to be the limit value as soon as possible. In such a setting, since the discharging current that discharges the gate of the MOS field effect transistor M15 becomes large, ringing of the output current Ip becomes large, but a time required to reduce the output current Ip from the start value to the limit value can be shortened. On the other hand, when the control value of the drain current Ids_M22 of the MOS field effect transistor M22 is set to be large, the ringing of the output current Ip becomes small, but the time required to reduce the output current Ip from the start value to the limit value is lengthened.

In FIG. 3, a waveform of the output current Ip when the control value of the drain current Ids_M22 of the MOS field effect transistor M22 is set to be small is depicted by a thick solid line. Further, in FIG. 3, a waveform of the output current Ip when the control value of the drain current Ids_M22 of the MOS field effect transistor M22 is set to be large is depicted by a thin solid line.

Figure 4:
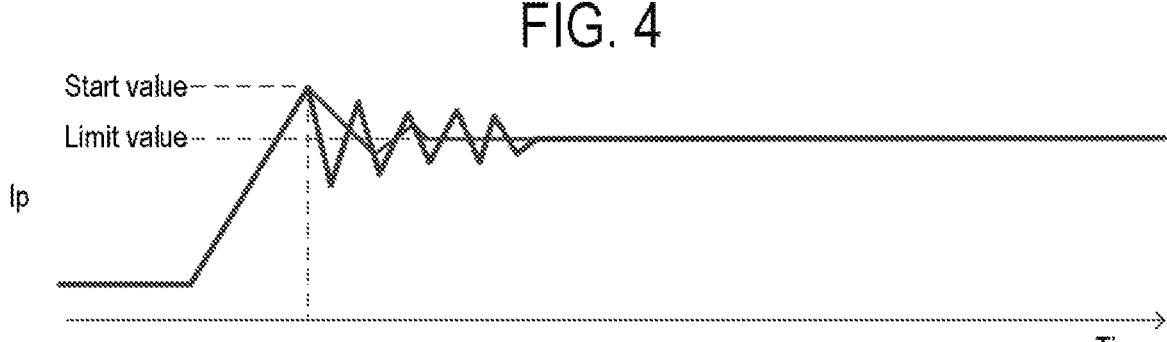
FIG. 4 is a waveform diagram of an output current of the semiconductor device according to the first embodiment.

For example, when the difference between the start value and the limit value is small as shown in FIG. 4, the control value of the drain current Ids_M22 of the MOS field effect transistor M22 may be set to be large so that priority is given to quickly converging the output current Ip to the limit value. In such a setting, since the discharging current that discharges the gate of the MOS field effect transistor M15 becomes small, the time required to lower the output current Ip from the start value to the limit value is lengthened, but the ringing of the output current Ip becomes small. On the other hand, when the control value of the drain current Ids_M22 of the MOS field effect transistor M22 is set to be small, the time required to lower the output current Ip from the start value to the limit value can be shortened, but the ringing of the output current Ip becomes large.

In FIG. 4, similarly to FIG. 3, a waveform of the output current Ip when the control value of the drain current Ids_M22 of the MOS field effect transistor M22 is set to be small is depicted by a thick solid line. Further, in FIG. 4, similarly to FIG. 3, a waveform of the output current Ip when the control value of the drain current Ids_M22 of the MOS field effect transistor M22 is set to be large is depicted by a thin solid line.

Second Embodiment

Figure 5:
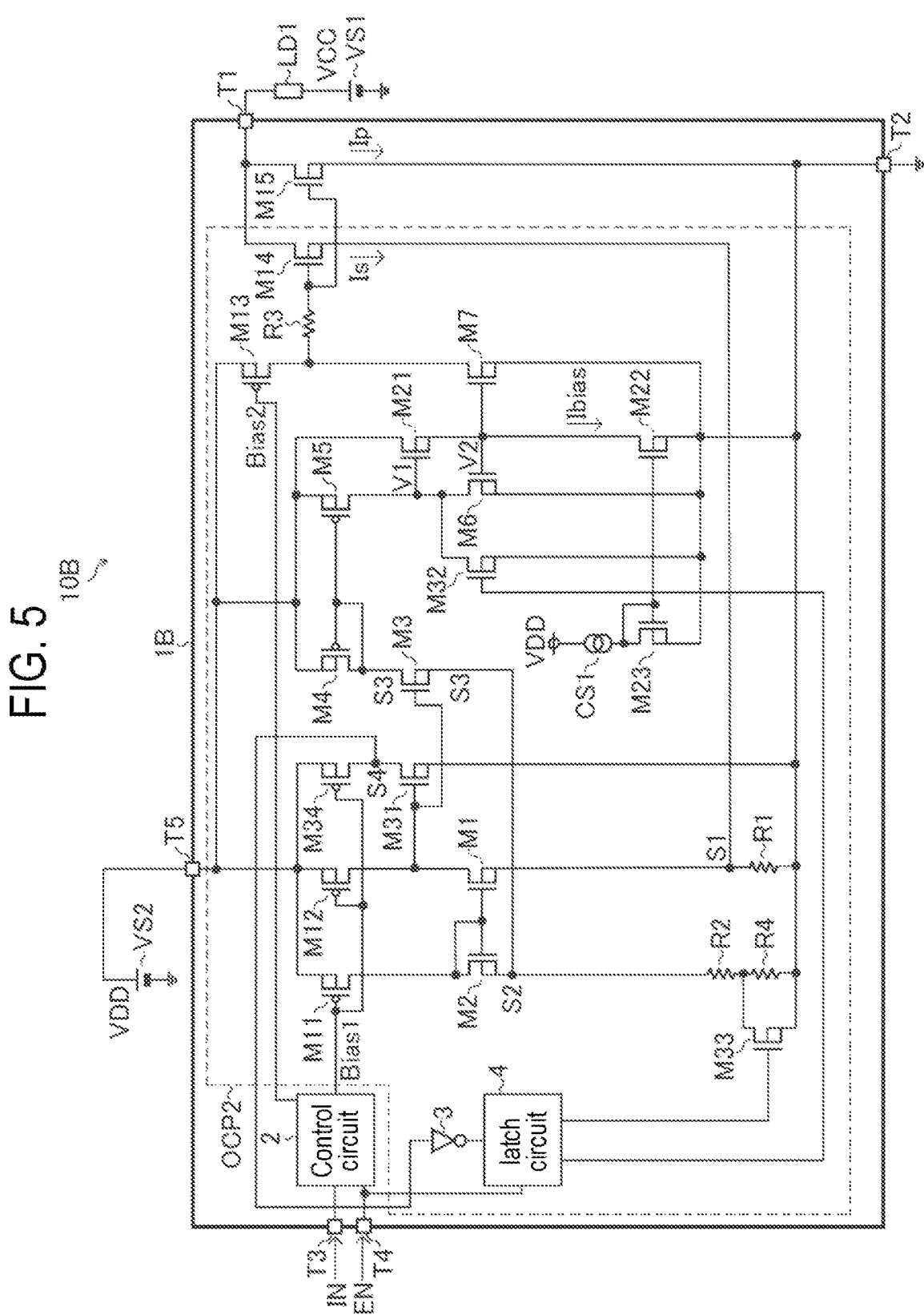
FIG. 5 is a diagram showing a configuration of an electronic apparatus according to a second embodiment.

FIG. 5 is a diagram showing a configuration of an electronic apparatus according to a second embodiment. An electronic apparatus 10B shown in FIG. 5 includes a semiconductor device 1B, a load LD1, and DC power supplies VS1 and VS2. In this embodiment, the load LD1 is, for example, a capacitive load such as a bulb lamp.

The semiconductor device 1B has a configuration in which the overcurrent protection circuit OCP1 in the semiconductor device 1A is replaced with an overcurrent protection circuit OCP2.

The overcurrent protection circuit OCP2 has a configuration in which MOS field effect transistors M31 to M34, a resistor R4, an inverter 3, and a latch circuit 4 are added to the overcurrent protection circuit OCP1.

The MOS field effect transistors M31 to M33 are N-channel MOS field effect transistors. The MOS field effect transistor M34 is a P-channel MOS field effect transistor.

When an enable signal EN is at a HIGH level, the latch circuit 4 is in an on state (operating state). When the enable signal EN is at a LOW level, the latch circuit 4 is in an off state (non-operating state). When the enable signal EN switches from the LOW level to the HIGH level, the latch circuit 4 enters an initial state and starts operating.

A source and a back gate of the MOS field effect transistor M34 are connected to the terminal T5. The control circuit 2 supplies a bias voltage Bias1 to a gate of the MOS field effect transistor M34.

A drain of the MOS field effect transistor M34 is connected to a drain of the MOS field effect transistor M31 and an input terminal of the inverter 3. A gate of the MOS field effect transistor M31 is connected to the drain of the MOS field effect transistor M12, the drain of the MOS field effect transistor M1, and the gate of the MOS field effect transistor M3. An output signal of the inverter 3 is supplied to the latch circuit 4.

The second end of the resistor R2 is connected to the ground potential via the resistor R4 and the terminal T2. The second end of the resistor R2 and a first end of the resistor R4 are connected to a drain of the MOS field effect transistor M33. A second end of the resistor R4 is connected to a source and a back gate of the MOS field effect transistor M33. An output of the latch circuit 4 is supplied to a gate of the MOS field effect transistor M33. A circuit constituted by the resistors R2 and R4 and the MOS field effect transistor M33 is a variable resistor having a resistance value that is switched according to whether the MOS field effect transistor M33 is turned on or turned off.

A source and a back gate of the MOS field effect transistor M31 are connected to the ground potential via the terminal T2.

The MOS field effect transistor M32 is connected in parallel to the MOS field effect transistor M6. The output of the latch circuit 4 is supplied to a gate of the MOS field effect transistor M32.

The MOS field effect transistor M31 outputs a comparison result S4 between the detection signal (detection voltage) S1 and the reference signal (reference voltage) S2.

Figure 6:
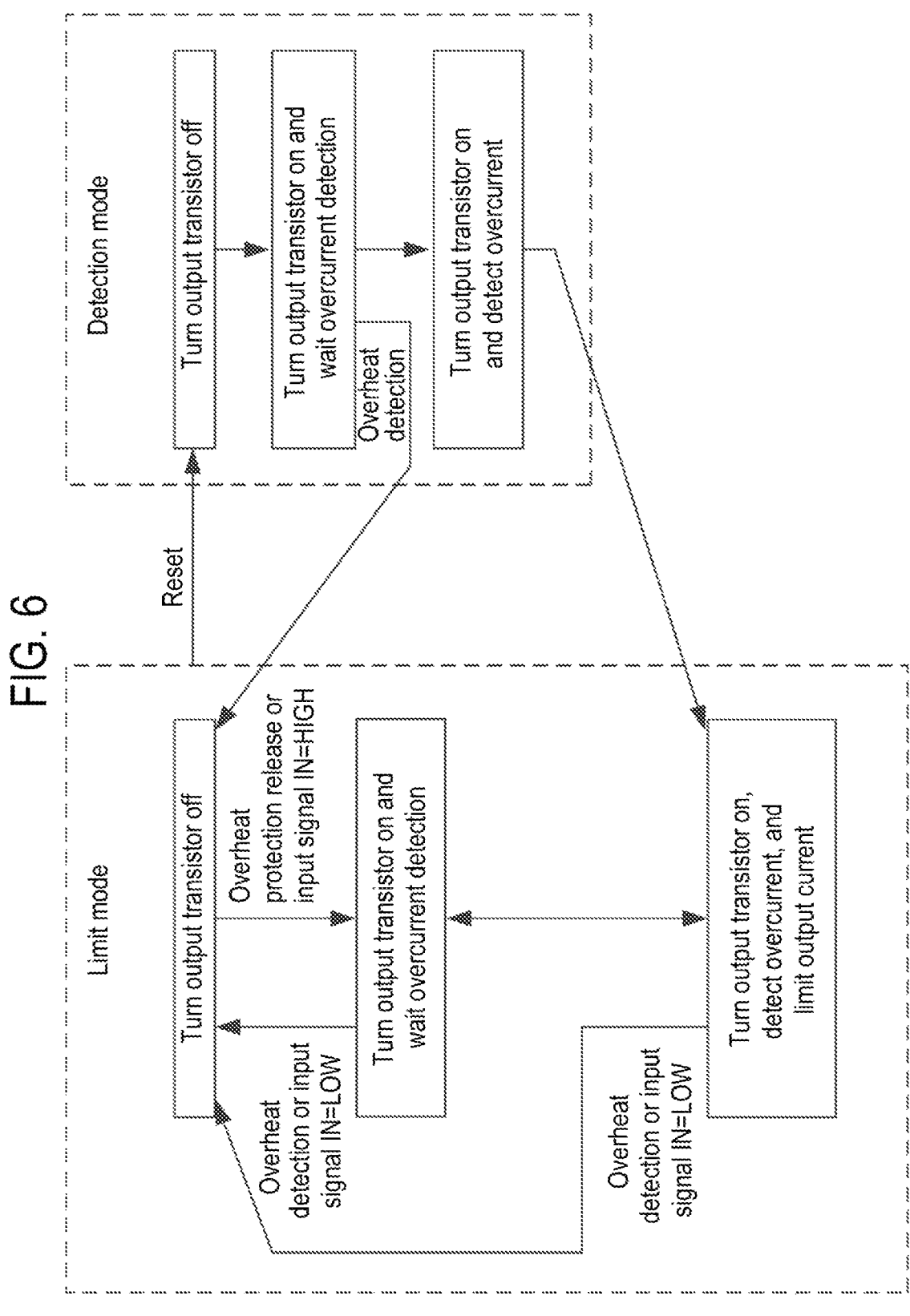
FIG. 6 is a state transition diagram of a semiconductor device according to the second embodiment.

The overcurrent protection circuit OCP2 determines whether or not the output current Ip, which is a current to be monitored, exceeds a first start value in a detection mode, and determines whether or not the output current Ip exceeds a second start value, which is smaller than the first start value, in a limit mode. The overcurrent protection circuit OCP2 does not limit the output current Ip in the detection mode. The overcurrent protection circuit OCP2 limits the output current Ip to the limit value when the output current Ip exceeds the second start value in the limit mode. In the initial state (when the semiconductor device 1B is started or when the semiconductor device 1B is reset), the overcurrent protection circuit OCP2 is in the detection mode. Therefore, a state of the semiconductor device 1B transitions as shown in FIG. 6.

The overcurrent protection circuit OCP2 switches the start value in two stages.

Here, an operation of the overcurrent protection circuit OCP2 when switching from the detection mode to the limit mode will be described.

When the sense current Is increases in the detection mode, the detection signal (detection voltage) S1 also increases. Then, when the detection signal (detection voltage) S1 and the reference signal (reference voltage) S2 substantially match, the comparison result S4 switches from a HIGH level to a LOW level, and the MOS field effect transistor M33 is turned on so that the reference signal (reference voltage) S2 tries to decrease. However, since the current output signal S3 is input as a negative feedback to the amplifier input stage, the reference signal (reference voltage) S2 tries to increase when the MOS field effect transistor M3 is turned on. Due to a balance of both described above, the reference signal (reference voltage) S2 decreases while maintaining the substantially match state between the detection signal (detection voltage) S1 and the reference signal (reference voltage) S2.

At this time, since the MOS field effect transistor M7 becomes half-on, a gate potential of each of the MOS field effect transistors M14 and M15 decreases, and the sense current Is, as well as the detection signal (detection voltage) S1 also decreases. Since the detection signal (detection voltage) S1 is input as a negative feedback to the amplifier input stage, the gate potential of each of the MOS field effect transistors M14 and M15 is controlled so that the detection signal (detection voltage) S1 and the reference signal (reference voltage) S2 substantially match.

While the overcurrent protection circuit OCP2 allows a rush current by the detection mode, after the rush current exceeding an allowable range flows due to short-circuit of a load and the like, the overcurrent protection circuit OCP2 can limit the current to a low current, which is lower than the rush current, by the limit mode, and furthermore suppress an increase in circuit scale.

Figure 7:
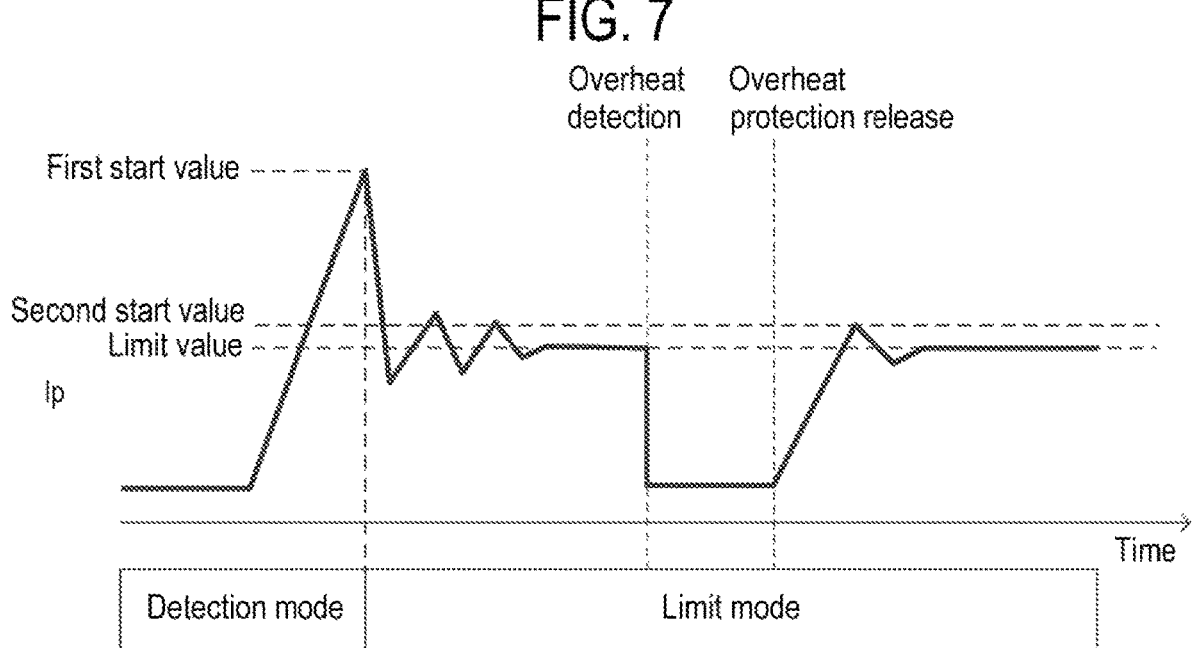
FIG. 7 is a waveform diagram of an output current of the semiconductor device according to the second embodiment.

As shown in FIG. 7, since a difference between the first start value and the limit value is large, immediately after switching from the detection mode to the limit mode, the control value of the drain current Ids_M22 of the MOS field effect transistor M22 may be set to be small.

On the other hand, as shown in FIG. 7, since a difference between the second starting value and the limit value is small, once the output current Ip converges to the limit value in the limit mode, the control value of the drain current Ids_M22 of the MOS field effect transistor M22 may be set to be large.

Therefore, in the present embodiment, a current source constituted by the current source CS1 and the MOS field effect transistors M22 and M23 is configured to vary the control value of the drain current Ids_M22 of the MOS field effect transistor M22. Specifically, the current source has a configuration in which the output current value of the current source CS1 is variable.

First Control Example

In a first control example of the current source constituted by the current source CS1 and the MOS field effect transistors M22 and M23, the control value of the drain current Ids_M22 of the MOS field effect transistor M22 varies based on the comparison result S4. Specifically, the output current value of the current source CS1 varies based on the comparison result S4.

Figure 8:
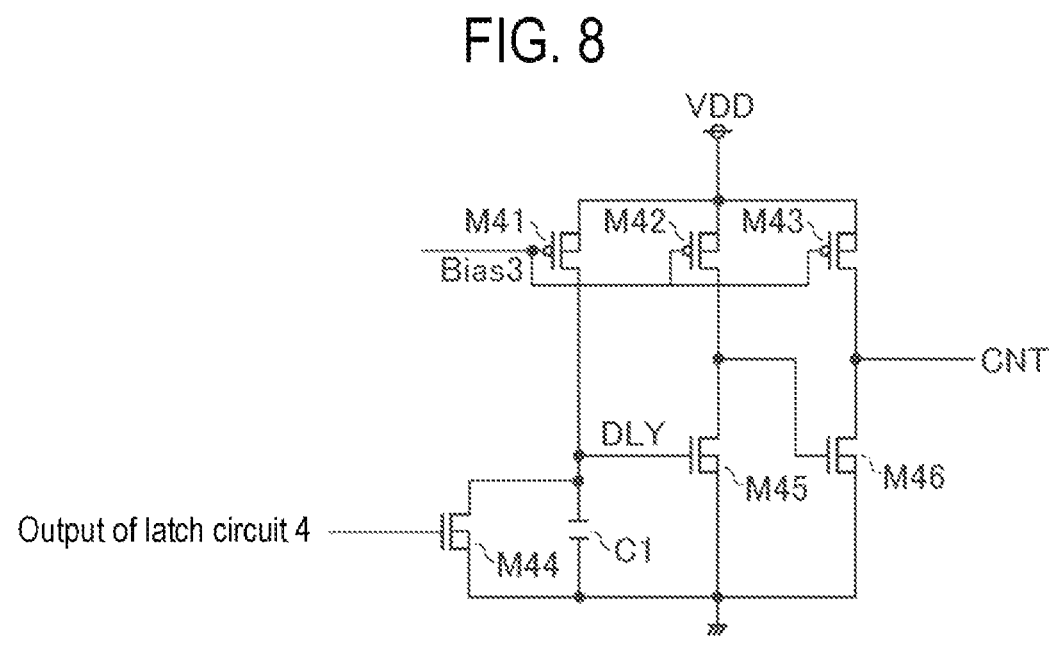

In the first control example of the current source constituted by the current source CS1 and the MOS field effect transistors M22 and M23, the overcurrent protection circuit OCP2 includes, for example, a control circuit shown in FIG. 8.

The control circuit shown in FIG. 8 includes MOS field effect transistors M41 to M46 and a capacitor CL. The control circuit shown in FIG. 8 charges the capacitor C1 using the output of the latch circuit 4, which is a signal based on the comparison result S4, generates a signal DLY according to a charging amount of the capacitor C1, generates a control signal CNT using the signal DLY, and supplies the control signal CNT to the current source CS1. The control signal CNT is a delayed signal of the signal based on the comparison result S4.

Figure 9:
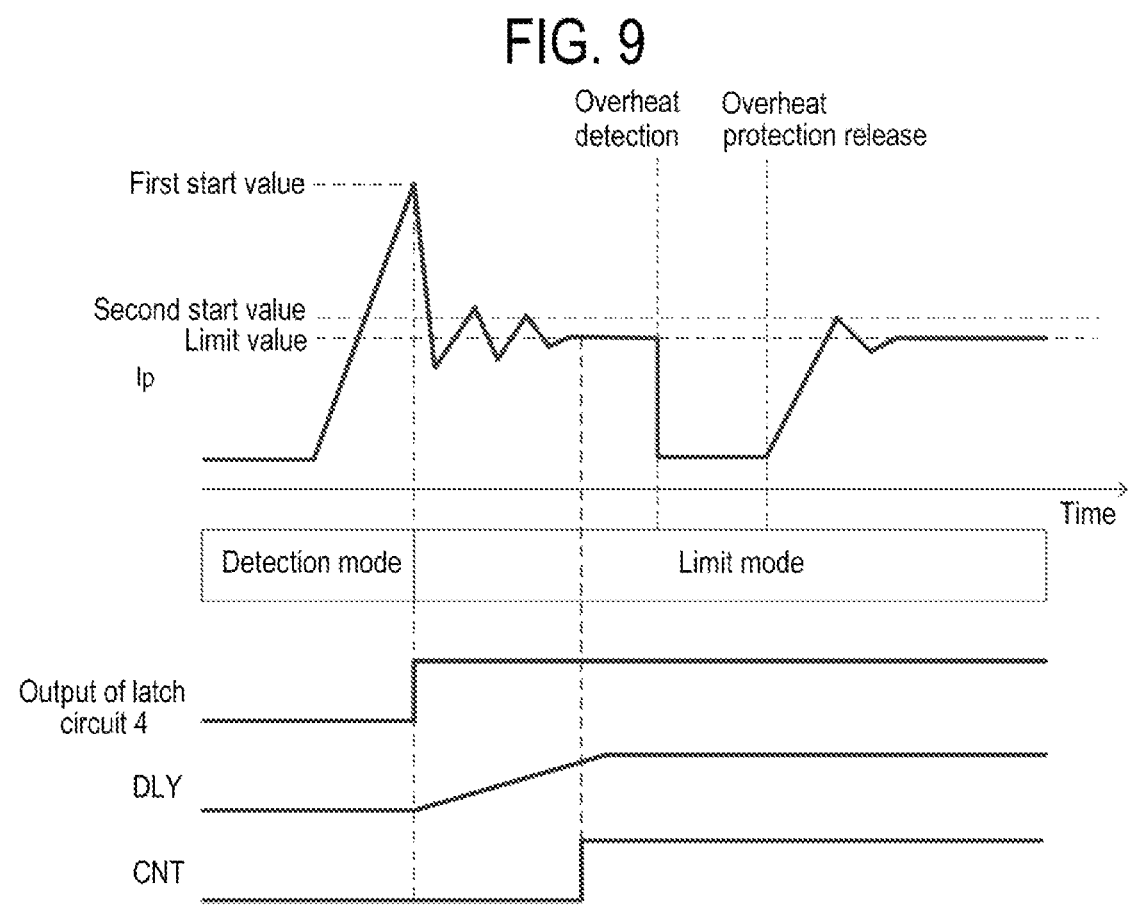

Waveforms of the output of the latch circuit 4, the signal DLY, and the control signal CNT are as shown in FIG. 9, for example.

Second Control Example

In a second control example of the current source constituted by the current source CS1 and the MOS field effect transistors M22 and M23, the control value of the drain current Ids_M22 of the MOS field effect transistor M22 varies based on a signal (thermal protection detection signal) indicating that a temperature to be monitored (for example, an ambient temperature of the output transistor M15) exceeds a predetermined value. Specifically, the output current value of the current source CS1 varies based on the thermal protection detection signal.

Figure 10:
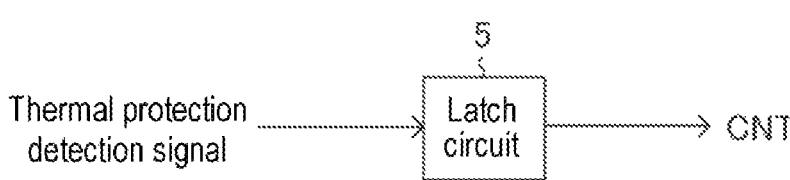
FIG. 10 is a diagram showing a second configuration example of the control circuit.

In the second control example of the current source constituted by the current source CS1 and the MOS field effect transistors M22 and M23, the overcurrent protection circuit OCP2 includes, for example, a control circuit shown in FIG. 10.

The control circuit shown in FIG. 10 includes a latch circuit 5. The control circuit shown in FIG. 10 latches the thermal protection detection signal to generate a control signal CNT and supplies the control signal CNT to the current source CS1.

Figure 11:
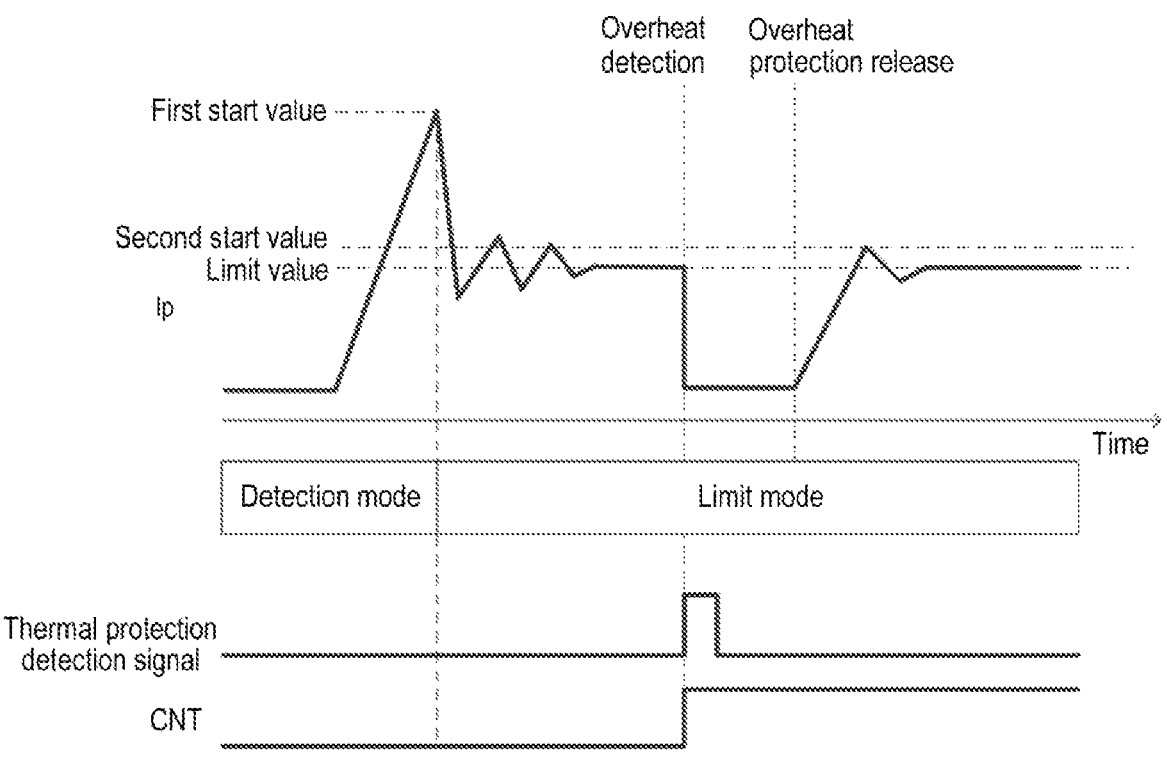
FIG. 11 is a diagram for explaining an operation of the control circuit shown in FIG. 10.

Waveforms of the thermal protection detection signal and the control signal CNT are as shown in FIG. 11, for example.

<Application to Vehicle>

Figure 12:
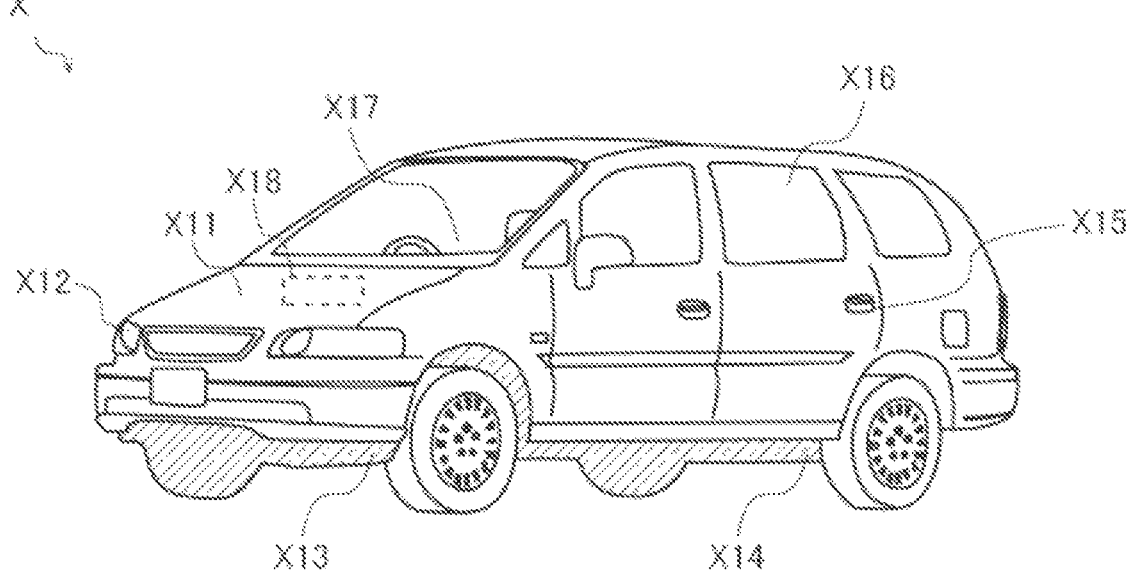
FIG. 12 is an external view of a vehicle.

FIG. 12 is an external view showing an example of a configuration of a vehicle. A vehicle X of this configuration example is equipped with various load drive devices that operate with power supplied from a battery.

The vehicle X includes not only engine vehicles, but also electric vehicles (xEVs such as BEV [Battery Electric Vehicle], HEV [Hybrid Electric Vehicle], PHEV/PHV [Plug-in Hybrid Electric Vehicle/Plug-in Hybrid Vehicle], and FCEV/FCV [Fuel Cell Electric Vehicle)/Fuel Cell Vehicle]).

In addition, mounting positions of electronic apparatuses X11 to X18 in FIG. 12 may be different from actual ones for the sake of convenience of illustration.

The electronic apparatus X11 is an electronic control unit that performs engine-related control (injection control, electronic throttle control, idling control, oxygen sensor heater control, auto-cruise control, and the like) or motor-related control (torque control, power regeneration control, and the like).

The electronic apparatus X12 is a lamp control unit that performs lighting-on/off control of HID [High Intensity Discharged Lamp], DRL [Daytime Running Lamp], and the like.

The electronic apparatus X13 is a transmission control unit that performs transmission-related control.

The electronic apparatus X14 is a braking unit that performs control related to motion of the vehicle X (ABS [Anti-lock Brake System] control, EPS [Electric Power Steering] control, electronic suspension control, and the like).

The electronic apparatus X15 is a security control unit that performs drive control of a door lock, a security alarm, and the like.

The electronic apparatus X16 is an electronic apparatus incorporated in the vehicle X at the factory shipment stage as standard equipment or manufacturer's options, such as a wiper, an electric door mirror, a power window, a damper (shock absorber), an electric sunroof, an electric seat, and the like.

The electronic apparatus X17 is an electronic apparatus that is mounted on the vehicle X as user's options such as an in-vehicle A/V [Audio/Visual] apparatus, a car navigation system, an ETC [Electronic Toll Collection] system, and the like.

The electronic apparatus X18 is an electronic apparatus equipped with high pressure-resistant motors such as an in-vehicle blower, an oil pump, a water pump, a battery cooling fan, and the like.

In addition, the above-described electronic apparatus 10A can be understood as any one of the electronic apparatuses X11 to X18. That is, the above-described semiconductor device 1A can be incorporated into any one of the electronic apparatuses X11 to X18. The above-described electronic apparatus 10B can be understood as an electronic apparatus including a capacitive load among the electronic apparatuses X11 to X18. That is, the above-described semiconductor device 1B can be incorporated into any one of the electronic apparatuses X11 to X18 including the capacitive load.

Others

The embodiments of the present disclosure can be appropriately modified in various ways within the scope of the technical ideas shown in the claims. The various embodiments described so far may be combined as appropriate unless contradictory. The above-described embodiments are merely examples of the embodiments of the present disclosure, and the meanings of the terms of the present disclosure or configuration requirements are not limited to those described in the above-described embodiments.

For example, in the above-described embodiments, an example of application to the low-side switch IC is provided, but the same circuit configuration as in the above-described embodiments can also be applied to a high-side switch IC.

SUPPLEMENTARY NOTES

Supplementary notes will be provided for the present disclosure in which specific configuration examples are shown in the above-described embodiments.

An overcurrent protection circuit (OCP1, OCP2) of the present disclosure limits a current to be monitored based on a current limit signal and includes: a first transistor (M1) and a second transistor (M2) configured to form an amplifier input stage that receives input of a detection signal according to the current to be monitored; a third transistor (M3) configured generate a current output signal according to a difference between the detection signal and a reference signal, and configured to form an amplifier output stage that inputs the current output signal as a negative feedback to the amplifier input stage; and a current mirror circuit configured to generate the current limit signal by replicating a signal based on the current output signal, wherein the current mirror circuit includes a fourth transistor (M6), a fifth transistor (M7), a source follower circuit (M21), and a first current source (M22, M23, CS1), wherein a gate of the source follower circuit is connected to an input end of the current mirror circuit, and a source of the source follower circuit is connected to a gate of the fourth transistor and a gate of the fifth transistor, and wherein the first current source is configured to control a value of a discharging current that discharges the gate of the fourth transistor and the gate of the fifth transistor (first configuration).

According to the overcurrent protection circuit of the first configuration, since a charging current can be supplied to the gate of the fourth transistor and the gate of the fifth transistor by the source follower circuit, the startup time of the current mirror circuit can be shortened, which results in a high-speed response.

In addition, according to the overcurrent protection circuit of the first configuration, since the value of the discharging current that discharges the gate of the fourth transistor and the gate of the fifth transistor is controlled by the first current source, the behavior (waveform) of the current to be monitored when the current to be monitored is limited can be controlled to a desired behavior (waveform).

In the overcurrent protection circuit of the first configuration, after the current to be monitored reaches a start value, the current to be monitored may be limited to converge to a limit value smaller than the start value (second configuration).

In the overcurrent protection circuit of the second configuration, the start value may be switched (third configuration).

The overcurrent protection circuit of the third configuration may further include a sixth transistor (M31) configured to output a comparison result between the detection signal and the reference signal, wherein a value of the reference signal may be switched based on the comparison result (fourth configuration).

In the overcurrent protection circuit of the fourth configuration, the first current source may be configured to vary the discharging current based on the comparison result (fifth configuration).

In the overcurrent protection circuit of the fifth configuration, the first current source may be configured to vary the discharging current based on a delayed signal of a signal, which is based on the comparison result (sixth configuration).

In the overcurrent protection circuit of the fifth configuration, the first current source may be configured to vary the discharging current based on a signal indicating that a temperature to be monitored exceeds a predetermined value (seventh configuration).

In the overcurrent protection circuit of any one of the fourth to seventh configurations, a first main electrode of the first transistor may be connected to a control electrode of each of the third transistor and the sixth transistor, a first main electrode of the second transistor may be connected to a control electrode of each of the first transistor and the second transistor, a first main electrode of the third transistor may be connected to an output node of the current output signal, a second main electrode of the first transistor may be connected to an application terminal of the detection signal, a second main electrode of the second transistor may be connected to a second main electrode of the third transistor, and a first main electrode of the sixth transistor may be connected to a first potential node (eighth configuration).

The overcurrent protection circuit of the eighth configuration may further include: a second current source (M12) connected between a second potential node and the first main electrode of the first transistor and configured to generate a reference current; and a third current source (M11) connected between the second potential node and the first main electrode of the second transistor and configured to generate the reference current (ninth configuration).

The overcurrent protection circuit of the eight configuration may further include: a fixed resistor (R1) connected between the second main electrode of the first transistor and the first potential node; and a variable resistor (R2, R4, M33) connected between the second main electrode of the second transistor and the first potential node (tenth configuration).

The overcurrent protection circuit of the tenth configuration may further include: a latch circuit (4) configured to latch the comparison result, wherein a resistance value of the variable resistor varies based on an output of the latch circuit (eleventh configuration).

A semiconductor device (1A, 1B) of the present disclosure includes: an output transistor (M15); and the overcurrent protection circuit of any one of the first to eleventh configurations, wherein an output current flowing through the output transistor is the current to be monitored (twelfth configuration).

In the semiconductor device of the twelfth configuration, the overcurrent protection circuit may be configured to limit the output current by controlling a drive signal for the output transistor based on the current output signal (thirteenth configuration).

An electronic apparatus (10A, 10B) of the present disclosure includes the semiconductor device of the twelfth or thirteenth configuration (fourteenth configuration).

A vehicle (X) of the present disclosure includes the electronic apparatus of the fourteenth configuration (fifteenth configuration).

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An overcurrent protection circuit that limits a current to be monitored based on a current limit signal, comprising:
a first transistor and a second transistor configured to form an amplifier input stage that receives input of a detection signal according to the current to be monitored;
a third transistor configured to generate a current output signal according to a difference between the detection signal and a reference signal, and configured to form an amplifier output stage that inputs the current output signal as a negative feedback to the amplifier input stage; and
a current mirror circuit configured to generate the current limit signal by replicating a signal based on the current output signal,
wherein the current mirror circuit includes a fourth transistor, a fifth transistor, a source follower circuit, and a first current source,
wherein a gate of the source follower circuit is connected to an input end of the current mirror circuit, and a source of the source follower circuit is connected to a gate of the fourth transistor and a gate of the fifth transistor, and
wherein the first current source is configured to control a value of a discharging current that discharges the gate of the fourth transistor and the gate of the fifth transistor.

2. The overcurrent protection circuit of claim 1, wherein after the current to be monitored reaches a start value, the current to be monitored is limited to converge to a limit value smaller than the start value.

3. The overcurrent protection circuit of claim 2, wherein the start value is switched.

4. The overcurrent protection circuit of claim 3, further comprising a sixth transistor configured to output a comparison result between the detection signal and the reference signal,
wherein a value of the reference signal is switched based on the comparison result.

5. The overcurrent protection circuit of claim 4, wherein the first current source is configured to vary the discharging current based on the comparison result.

6. The overcurrent protection circuit of claim 5, wherein the first current source is configured to vary the discharging current based on a delayed signal of a signal, which is based on the comparison result.

7. The overcurrent protection circuit of claim 5, wherein the first current source is configured to vary the discharging current based on a signal indicating that a temperature to be monitored exceeds a predetermined value.

8. The overcurrent protection circuit of claim 4, wherein a first main electrode of the first transistor is connected to a control electrode of each of the third transistor and the sixth transistor,
wherein a first main electrode of the second transistor is connected to a control electrode of each of the first transistor and the second transistor,
wherein a first main electrode of the third transistor is connected to an output node of the current output signal,
wherein a second main electrode of the first transistor is connected to an application terminal of the detection signal,
wherein a second main electrode of the second transistor is connected to a second main electrode of the third transistor, and
wherein a first main electrode of the sixth transistor is connected to a first potential node.

9. The overcurrent protection circuit of claim 8, further comprising:
a second current source connected between a second potential node and the first main electrode of the first transistor and configured to generate a reference current; and
a third current source connected between the second potential node and the first main electrode of the second transistor and configured to generate the reference current.

10. The overcurrent protection circuit of claim 8, further comprising:
a fixed resistor connected between the second main electrode of the first transistor and the first potential node; and
a variable resistor connected between the second main electrode of the second transistor and the first potential node.

11. The overcurrent protection circuit of claim 10, further comprising a latch circuit configured to latch the comparison result,
wherein a resistance value of the variable resistor varies based on an output of the latch circuit.

12. A semiconductor device comprising:
an output transistor; and
the overcurrent protection circuit of claim 1,
wherein an output current flowing through the output transistor is the current to be monitored.

13. The semiconductor device of claim 12, wherein the overcurrent protection circuit is configured to limit the output current by controlling a drive signal for the output transistor based on the current output signal.

14. An electronic apparatus comprising the semiconductor device of claim 12.

15. A vehicle comprising the electronic apparatus of claim 14.

* * * * *